Oct. 23, 1962 C. HARMON 3,059,313
TEXTILE FABRICS AND METHODS OF MAKING THE SAME
Filed March 26, 1958 6 Sheets-Sheet 1
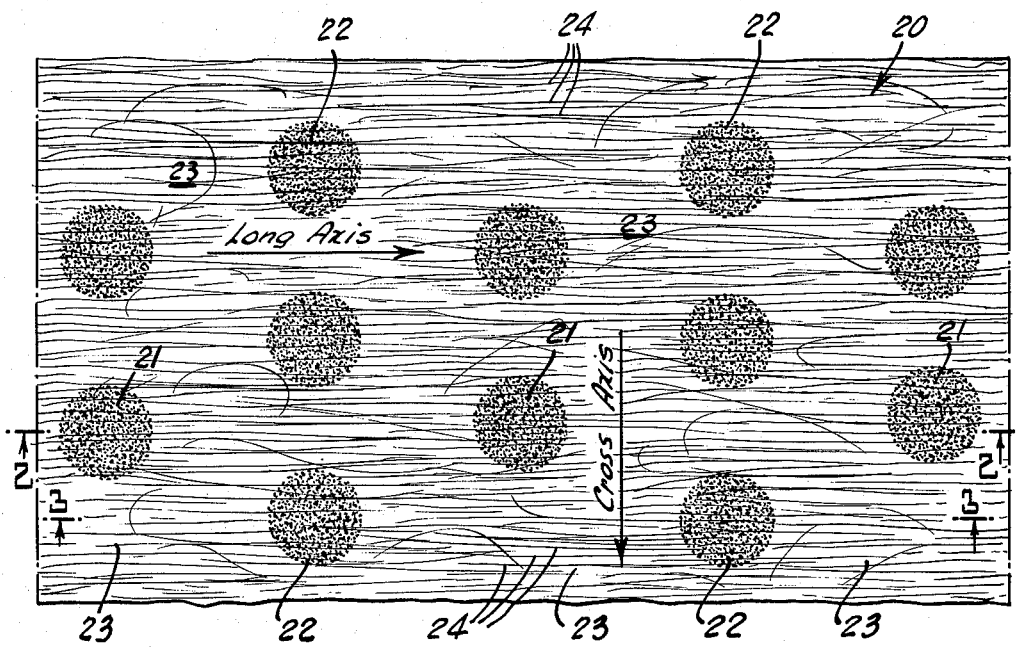
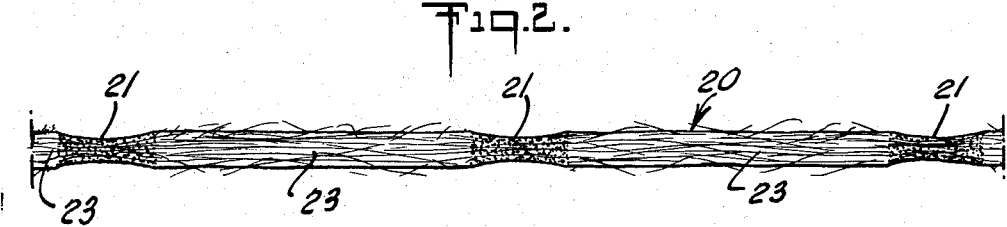
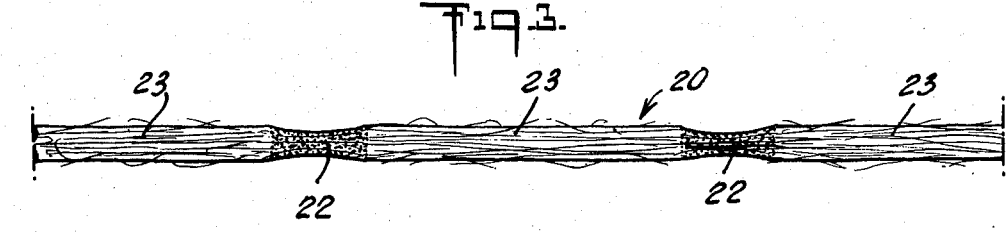
INVENTOR
CARLYLE HARMON
BY
Alexander T. Kardos
ATTORNEY

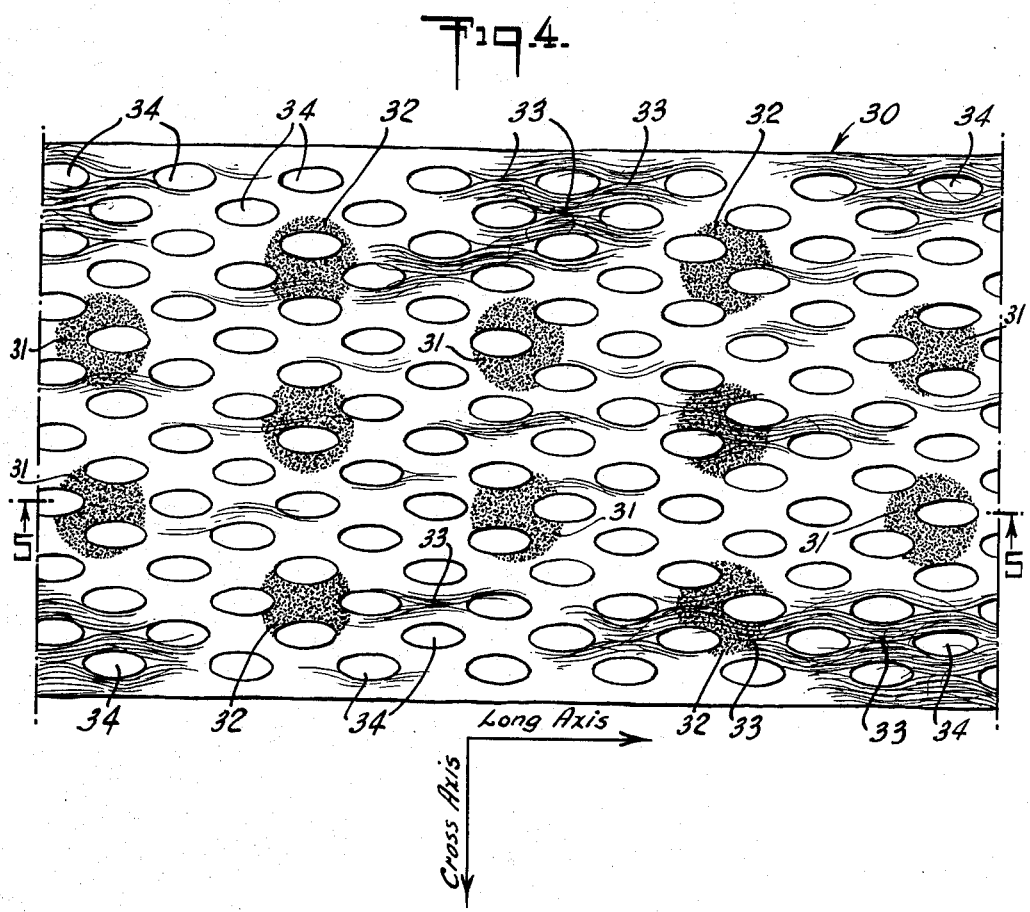
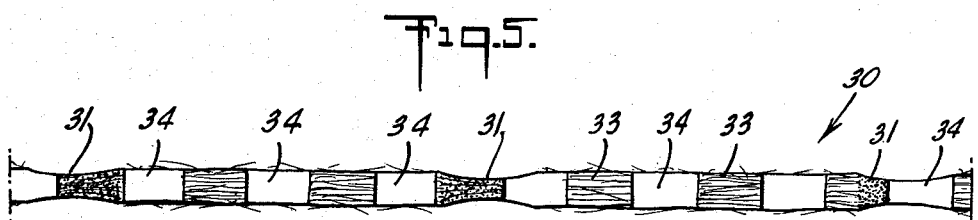

Oct. 23, 1962  C. HARMON  3,059,313
TEXTILE FABRICS AND METHODS OF MAKING THE SAME
Filed March 26, 1958  6 Sheets-Sheet 3
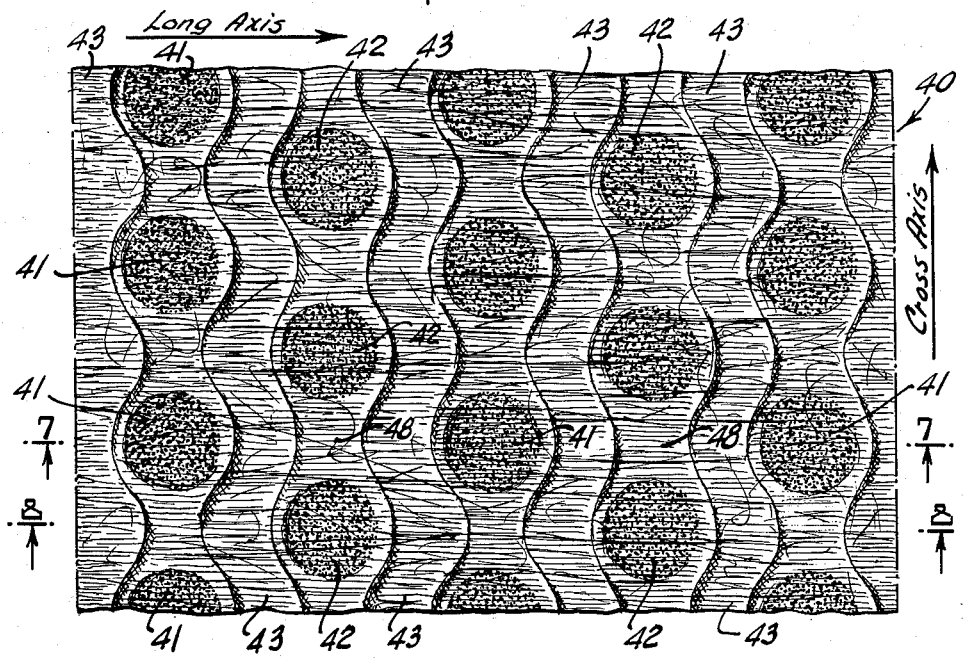
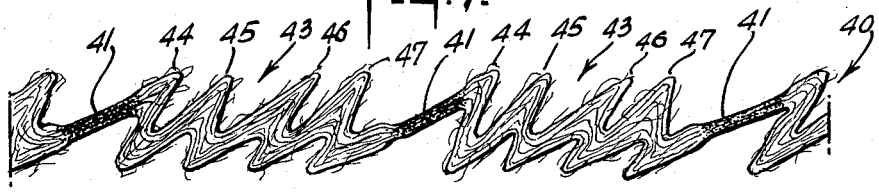
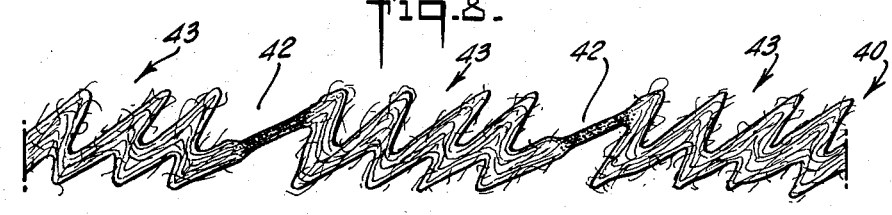
INVENTOR
CARLYLE HARMON
BY
Alexander T. Kardos
ATTORNEY Oct. 23, 1962 C. HARMON 3,059,313
TEXTILE FABRICS AND METHODS OF MAKING THE SAME
Filed March 26, 1958 6 Sheets-Sheet 4
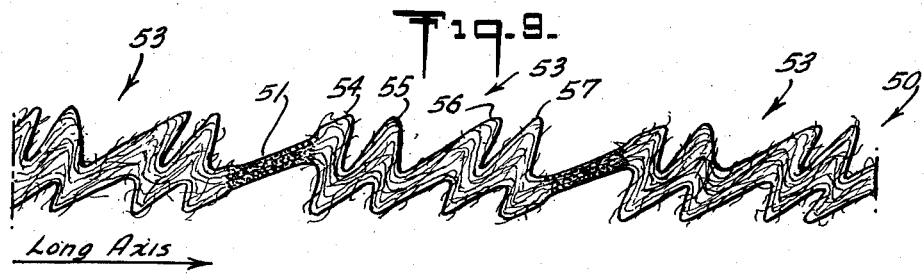
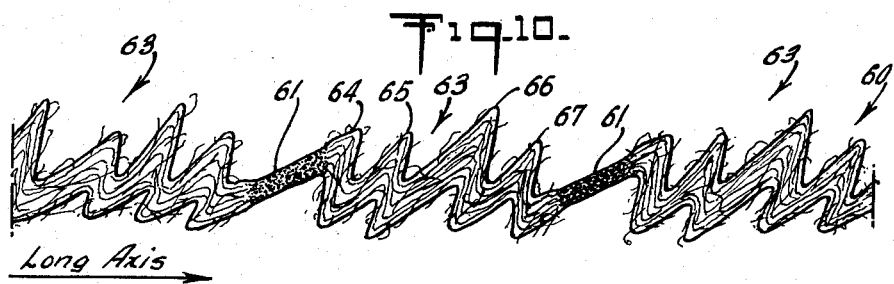
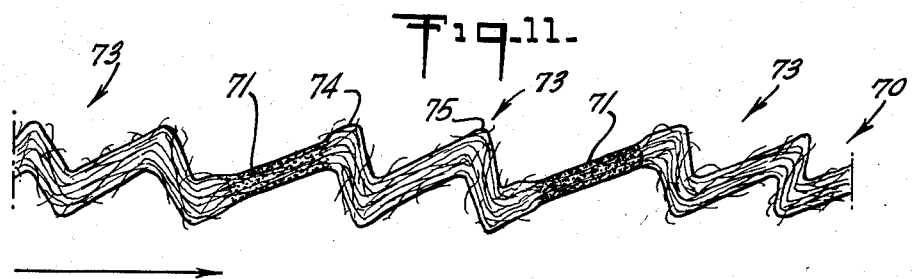
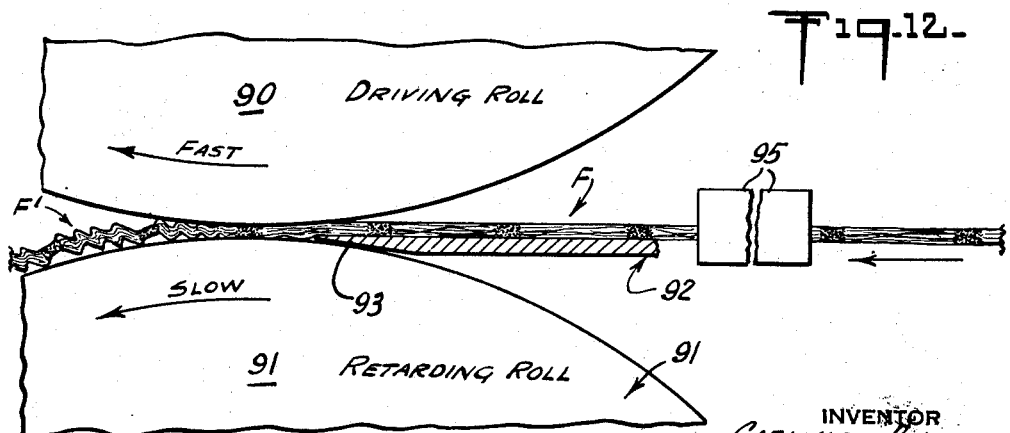
INVENTOR
CARLYLE HARMON
BY
Alexander T. Kardos
ATTORNEY Oct. 23, 1962  C. HARMON  3,059,313
TEXTILE FABRICS AND METHODS OF MAKING THE SAME Filed March 26, 1958  6 Sheets-Sheet 6

INVENTOR.
CARLYLE HARMON
BY
Alexander T. Kardos
ATTORNEY

United States Patent Office 3,059,313
Patented Oct. 23, 1962

3,059,313
TEXTILE FABRICS AND METHODS OF
MAKING THE SAME
Carlyle Harmon, Scotch Plains, N.J., assignor to Chicopee Manufacturing Corporation, a corporation of Massachusetts
Filed Mar. 26, 1958, Ser. No. 724,142
13 Claims. (Cl. 28—80)

The present invention relates to novel textile fabrics and to methods of making the same. More particularly, the present invention is concerned with the so-called "nonwoven" textile fabrics, i.e., fabrics produced from textile fibers without the use of conventional spinning, weaving, knitting or felting operations.

Although not limited thereto, the invention is of primary importance in connection with "oriented" or carded nonwoven fabrics composed of textile fibers, the major proportion of which are oriented predominantly in one direction. Typical of such fabrics are the so-called "Masslinn" nonwoven fabrics, some of which are described in greater particularity in U.S. Patents 2,705,687 and 2,705,-688, issued April 5, 1955, to De Witt R. Petterson et al. and I. S. Ness et al., respectively.

Another aspect of the present invention is its application to nonwoven fabrics wherein the fibers are predominantly oriented in one direction but are also reorganized and rearranged in predetermined designs and patterns of fabric openings and fiber bundles. Typical of such fabrics are the so-called "Kebak" bundled nonwoven fabrics, some of which are described in greater particularity in commonly-assigned, U.S. Patent 2,862,251 to Kalwaites, issued December 2, 1958, on an application which was a continuation-in-part of patent application Serial Number 500,735, filed April 12, 1955, now abandoned.

Still another aspect of the present invention is its application to nonwoven fabrics wherein the fibers are disposed at random and are not predominantly oriented in any one direction. Typical nonwoven fabrics made by such procedures are described in greater particularity, for example, in U.S. Patents 2,676,363 and 2,676,364 issued April 27, 1954, to C. H. Plummer et al.

Nonwoven fabrics made by any of the methods described in the above-mentioned patents have become increasingly important in the textile and related industry, primarily because of their low cost of manufacture, as compared to the cost of more conventional textile fabrics made by spinning, weaving, knitting, or felting. Another feature of such nonwoven fabrics is their particular applicability for uses where launderability or washability is not a prerequisite. As a consequence, nonwoven fabrics are of particular advantage in disposable products involving merely a single use before being discarded. Examples of such products are surgical dressings and bandages, covers or other elements of sanitary napkins, diapers, diaper liners, casket liners, hand towels, table napkins, curtains, draperies, etc. Because of this wide variety of uses, these nonwoven fabrics are available in a wide range of fabric weights of from about 100 grains per square yard to about 2000 grains per square yard.

Fabric stability and strength is usually created in such nonwoven fabrics by bonding with adhesive or cementitious materials. The bonding operation employed for stabilizing and strengthening nonwoven fabrics has taken on many forms, one of the most popular being the intermittent bonding of the nonwoven fabric with a predetermined pattern of spaced, discrete binder segments or areas whereby the fibers passing through such segments are adhered in a bonding relationship. One typical pattern is the annuli or "doughnut" pattern, such as illustrated in the aforesaid Petterson and Ness patents. This multiannulate pattern, or a solid circular pattern of similar geometric proportions and relationships, will be used in this patent application as illustrative of the present inventive concept. However, it is to be pointed out that such a pattern is illustrative of the present inventive concept and the broader aspects of this invention are not to be construed as limited thereto.

It is also to be observed that the following description of the present invention will refer primarily to the use of viscose staple rayon and/or cotton fibers in the basic preparation of the nonwoven fabrics. Again, such is primarily illustrative and other fibers may be used, either by themselves or in blends in various proportions with other fibers, as desired. Such other fibers include, for example, other natural fibers such as wool and silk; synthetic fibers including other forms of rayon such as cuprammonium rayon or other regenerated cellulosic fibers including saponified cellulose ester fibers; cellulose ester fibers such as cellulose acetate and cellulose triacetate fibers; polyamide fibers such as nylon 6, nylon 66, etc.; acrylic fibers such as "Acrilan," "Dynel," "Orlon," "Creslan," "Verel," etc.; polyester fibers such as "Dacron"; vinyl fibers such as "Vinyon," "Saran," "Velon," etc.; protein fibers such as "Vicara"; fluorocarbon fibers such as "Teflon"; dinitrile fibers such as "Darvan"; nitrile fibers such as "Zefran"; and so forth.

It is not essential that all the fibers be of staple or equivalent length, i.e., from about ½ inch in length up to about 2½ or 3 inches in length. Shorter fibers, such as wood pulp fibers, cotton linters, asbestos fibers and the like, having lengths from about ½ inch down to about ⅛ inch or less may be added in various proportions up to about 50% by weight, or even as high as 100% by weight, particularly where the original method of fabric formation involved a fluid deposition of the fibers, such as in a papermaking process, or in air deposition techniques.

Substantially all prior art nonwoven fabrics, regardless of the type of fibers used or of the particular bonding techniques employed, however, have usually suffered from certain inherent disadvantages and weaknesses which have militated against their more widespread acceptance and use by the industry and by the ultimate consumer.

For example, due to the nature of the fibrous construction and the alignment and orientation of the individual fibers in such prior art nonwoven fabrics, the elasticity and stretch characteristics, particularly in the long or "machine" direction thereof, have not been completely satisfactory. In some cases, the stretch in this long direction has been substantially zero and the use of such fabrics has been severely limited.

Another disadvantage resulting from the low stretch characteristics of these prior art nonwoven fabrics, particularly in the long direction thereof, is a lack of pliability or conformability to a particular form or configuration. This has prevented the acceptable use of such nonwoven textile fabrics wherever shaping or draping is required to a particular form or into an irregular configuration.

Still another disadvantage of many prior art nonwoven fabrics is their relative lack of softness and hand and their general harshness and stiffness. These disadvantages are particularly accentuated when heavier bonding covering a greater percentage of the fabric area is resorted to in order to obtain greater strength or increased resistance to launderability or washability.

It has now been determined that nonwoven fabrics having poor elasticity or streach characteristics, particularly in the long or "machine" direction, and those which do not possess sufficient conformability, drape or pliability and are not sufficiently soft, may be processed whereby a soft hand and drape and excellent elasticity and stretch, even in the long direction of the fabric, along with excellent conformability and pliability, may be obtained.

More specifically, it has now been found that such desirable properties may be obtained by intermittently bonding the fabrics with a predetermined pattern of spaced binder segments and then selectively crimping or crinkling the intermittently bonded nonwoven fabrics, whereby the binder segments remain relatively smooth and uncrimped or uncrinkled, but are separated by unbonded fabric areas which are relatively highly crimped and crinkled, thus giving the nonwoven fabric an unusually desirable appearance along with the required properties.

Other advantages and benefits of the present inventive concept will become apparent from a consideration of the following description which is to be construed with reference to the accompanying drawings wherein:

FIGURE 1 is a plan view on an enlarged scale approximately 8:1 diagrammatically illustrating a portion of a prior art nonwoven fabric;

FIGURE 2 is a cross-sectional view of the prior art nonwoven fabric of FIGURE 1, taken on the line 2—2 thereof in the direction indicated;

FIGURE 3 is a cross-sectional view of the prior art nonwoven fabric of FIGURE 1, taken on the line 3—3 thereof in the direction indicated;

FIGURE 4 is a plan view on an enlarged scale approximately 8:1, diagrammatically illustrating a portion of another prior art nonwoven fabric;

FIGURE 5 is a cross-sectional view of the prior art nonwoven fabric of FIGURE 4, taken on the line 5—5 thereof in the direction indicated;

FIGURE 6 is a plan view on an enlarged scale approximately 8:1, diagrammatically illustrating a portion of the nonwoven textile fabric of FIGURE 1, after it has been processed by the methods of the present invention;

FIGURE 7 is a cross-sectional view of the nonwoven textile fabric of FIGURE 6, taken on the line 7—7 thereof in the direction indicated;

FIGURE 8 is a cross-sectional view of the nonwoven textile fabric of FIGURE 6, taken on the line 8—8 thereof in the direction indicated;

FIGURE 9 is a cross-sectional view of another nonwoven textile fabric of the present invention on an enlarged scale approximately 8:1, showing a modification of the basic construction thereof;

FIGURE 10 is a cross-sectional view of still another nonwoven textile fabric of the present invention on an enlarged scale approximately 8:1, showing another modification of the basic construction thereof;

FIGURE 11 is a cross-sectional view of still another nonwoven textile fabric of the present invention on an enlarged scale approximately 8:1, showing a modification of the basic construction thereof;

FIGURE 12 is a fragmentary elevation on an enlarged scale, showing one form of apparatus suitable for carrying out the methods of the present invention;

Figure 13:
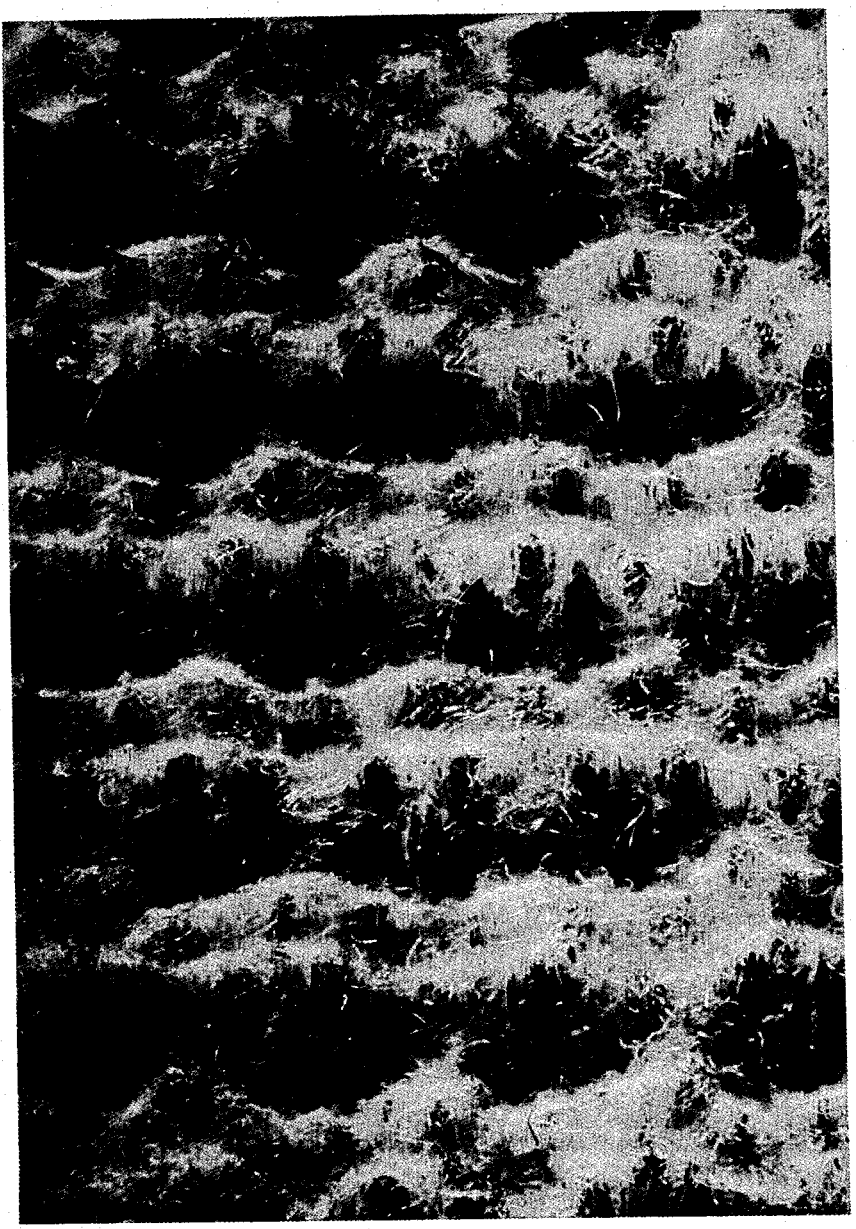
FIGURE 13 is a photomacrograph on an enlarged scale approximately 10:1 of a plan view of a portion of a nonwoven textile fabric of the present invention.

Referring now to FIGURES 1 through 3, there is shown a fibrous nonwoven fabric 20, somewhat basically similar to the "doughnut-bonded" "Masslinn" nonwoven fabric of FIGURES 1 and 1a of U.S. Patent 2,705,688 except that the annular binder segments therein are replaced with solid circular binder segments. Only a few aligned columns or rows of circular binder segments 21 and 22 are illustrated of the predetermined binder pattern or design but such is believed sufficient to describe the present invention. Unbonded fabric areas 23 of the fibrous nonwoven fabric 20 are shown lying between and separating the binder segments 21 and 22. The long and cross axes of the nonwoven fabric 20 are indicated by arrows.

FIGURE 2 is a cross section of the nonwoven fabric 20, taken on the line 2—2 passing approximately through the center of the column of binder segments 21 of FIGURE 1. This figure illustrates that the nonwoven fabric 20 is relatively smooth and flat, that it is not crimped or crinkled, and that it possesses bulk or loft to a moderate degree only.

FIGURE 3 is a cross section of the nonwoven fabric 20, taken on the line 3—3 passing approximately through the center of the column of binder segments 22 of FIGURE 1. This figure also illustrates that the nonwoven fabric 20 is relatively smooth and flat, that it is not crimped or crinkled, and that it also possesses bulk or loft to a moderate degree only. The offset or staggered phase relationship of the adjacent rows of circular binder segments 21 and 22 is also to be noted.

This fibrous nonwoven fabric 20 is a typical prior art product and is a suitable starting material for the improved processes of the present invention. It possesses an acceptable hand and drape and a degree of elasticity or stretch in the cross direction but does not have completely commercially acceptable pliability or conformability in certain applications because of a substantially zero elasticity or stretch in the long direction thereof.

In the above-mentioned Patent 2,862,251 there are described processes and apparatus for reorganizing and rearranging the individual fibers 24 of the fibrous nonwoven web 20 into predetermined patterns of fabric openings and fiber bundles. Such processes and apparatus have enhanced the hand and drape of the basic nonwoven fabric, as well as improving its elasticity and stretch in the cross direction, and to a low degree in the long direction. However, its conformability and pliability again have not been completely commercially acceptable because of its low elasticity and stretch in the long direction. Such a rearranged, bundled nonwoven fabric is illustrated in FIGURES 4 and 5. Such a nonwoven fabric may also have a predetermined pattern of solid circular binder segments similar to that of FIGURES 1 through 3. As a consequence, the pattern geometry of FIGURES 1 through 3 may be considered as generic for illustrative purposes only to all forms of bonded nonwoven textile fabrics, merely differing from each other in their basic fiber type and organization.

It is to be particularly noted that the total lateral surface of the binder segments should not substantially exceed about 35% of the total lateral surface of the nonwoven textile fabric, and should preferably be less than about 25% and down to about 10% of the total lateral surface of the nonwoven textile fabric. If greater than about 35% of the total lateral surface of the nonwoven textile is coated or impregnated with the binder segments, then the textile-like properties and other advantageous characteristics will be substantially sacrificed. This maximum value of 35% surface coverage by the binder segments holds true regardless of the form or shape of the individual binder segments, whether they are annular, circular, rectangular, elliptical, polygonal, irregular, or the like. This is strikingly true for nonwoven fabrics which are overall bonded, that is approximately 100% surface coverage by the binder, wherein substantially none of advantageous features of the present invention is obtained.

The percentage by weight of binder add-on to the fabric may be varied within relatively wide ranges depending upon the specific binder employed and the type, weight and thickness of the fabric. For some binders, as low as about 1% by weight has been found sufficient; for other fabrics and other binders, as high as about 20 to about 35% by weight has been found preferable. Within the more commercial aspects of the present invention, however, from about 1½% to about 25% has been found satisfactory.

With particular reference to FIGURE 4, a typical bonded rearranged and bundled nonwoven fabric 30, as made by processes and on apparatus in said Kalwaites patent, is shown. The predetermined pattern of fabric openings 34 and fiber bundles 33 is shown but it must be emphasized that the sizes and shapes thereof are merely illustrative of one possible pattern. Many other patterns of rounded or angular geometric figures such as ellipses, ovals, parallelograms, squares, rectangles, polygons, combinations thereof, etc. are of course possible. The binder segments 31 and 32 are shown as circular and, again, it must be pointed out that such is merely illustrative and not limitative of the present inventive concept. Such a nonwoven fabric 30 is well suited for processing by the methods of the present invention.

FIGURES 6 through 8 illustrate the fibrous nonwoven textile fabric 20 of FIGURE 1 now referred to by reference numeral 40, after it has been processed by the methods of the present invention. It is immediately noted that the unbonded fabric areas, now referred to by reference numerals 43, are relatively highly crimped or crinkled whereas the circular binder segments 41 and 42 have remained relatively smooth and are uncrimped and uncrinkled.

Particular reference to FIGURES 7 and 8 reveals that the circular binder segments 41 and 42 have acted as a resist to the crimping action and have remained relatively smooth. With regard to the unbonded fabric areas 43 which separate the binder segments 41 and 42, it is to be noted that the crimps and crinkles therein are very regularly and sharply defined usually coming to a relatively sharp acute angle. The apices or crests 44, 45, 46 and 47 of these acute angles are relatively sharp and are not too rounded as would be expected. In many cases, the configuration of the crimp or crinkle is such as to resemble saw-teeth which have been undercut to form a relatively jagged appearance.

The width of the nonwoven textile fabric 40, as measured in the cross direction along the cross axis, has remained substantially the same, whereas the length of the nonwoven textile fabric, as measured in the long direction along the long axis, has been markedly decreased due to the formation of the crimps and crinkles in the unbonded areas 43. A comparison of FIGURES 1 and 6 confirms these facts. A further study of the nonwoven textile fabrics processed by the present invention establishes that the original starting materials, having substantially negligible stretch or elongation in the long direction, have been transformed into extensible nonwoven textile fabrics, normally having up to from about 20% to about 30% (and in some instances to 40% elongation in the long direction. This property is all the more desirable when further study establishes that the nonwoven textile fabric has the property of returning almost instantaneously to its crimped length from the stretched length.

In the particular portion of the nonwoven textile fabric 40 illustrated in FIGURES 6 through 8, four crimps are shown in each unbonded fabric area 43. Microscopic analysis of other samples of other nonwoven textile fabrics reveals that there may be as few as only two crimps, or as many as six or eight crimps, in the unbonded fabric areas. The number of crimps or crinkles may be controlled within reasonable limits by selection of binder patterns and by following procedures and using apparatus to be more fully described hereinafter.

With particular reference to FIGURE 6 which is an enlarged view having a magnification of approximately 8 times, it is to be noted that the unbonded fabric areas 43 extend in a sinuous path widthwise of the nonwoven textile fabric 40. This sinuous appearance is basically due to the magnification of the nonwoven textile fabric inasmuch as a visual inspection of the unmagnified fabric with the naked eye indicates that the unbonded areas appear to extend across the fabric in a straight line. The presence of the circular binder segments 41 and 42 however, prevent such straightness and directness and create the curvature and waviness which is present in magnified FIGURE 6.

The circular binder segments 41 and 42 may be spaced closer to each other, as measured in a crosswise direction, than that shown in FIGURE 6, in which case the degree of curvature or waviness of the unbonded areas 32 is decreased and the net result is the formation of substantially straight areas with little sinuosity. Spacing of the binder segments 41 and 42 a greater distance apart than that shown in FIGURE 6 results in greater curvature and waviness of the unbonded fabric areas 43 whereby these unbonded areas ultimately completely surround the binder segments 42 to form "islands" therefrom when the binder segments 41 and 42 are sufficiently separated.

This influence and control exercised by the binder segments results in the ability to make many desired patterns and designs in the fabric which has been processed so that a strong resemblance can be developed therein to a knitted fabric, for example, and even to exhibit some of its advantageous elastic properties and characteristics of such a knitted fabric.

The result of such processing of the nonwoven fabric 40 is therefore not only the formation of very fine and sharply acute crimps and crinkles in the unbonded areas whereby bulk and loft are built into the nonwoven fabric but also the creation of extensibility and stretch in the long direction whereby elasticity and conformability are provided in the processed nonwoven textile fabric. Additionally, and even more surprising, is the formation of a series of pronounced crosswise troughs created by the binder segments 41 and 42 and a series of pronounced crosswise crests created by the crimped or crinkled unbonded areas 43. As a result of these sharply defined troughs and crests, the truly fabric-like appearance of a conventionally fabricated textile material is obtained to a surprising degree. Depending upon the relative sizes of the binder segments 41 and 42 and the spacing and relationship thereof, which leads to the development of various sizes of troughs and crests, the fabric-like appearance of a woven, kitted or crocheted textile material has been created.

The regularity and sharp definition of the crimps in the intermittently bonded nonwoven textile fabric of FIGURES 6 through 8 is to be compared to the results obtained when an overall bonded nonwoven fabric is processed by the methods of the present invention. The resulting processed overall bonded nonwoven fabric possesses waves or ripples which are irregular in form, width and depth. No predetermined pattern can be detected therein and the uniformity of the crimps of the nonwoven textile fabric of FIGURES 6 through 8 is absent. Additionally, the crests are stiff and the fabric is not acceptably soft.

Consideration of FIGURES 7 and 8 reveals that the first two crests 44 and 45 which follow a binder segment 41 are fairly closely spaced together. In a similar way, the third and fourth crests 46 and 47 which immediately precede a binder segment 41, are also relatively closely spaced together. The spacing between the second and third crests 45 and 46, however, is considerably larger than the spacing between the first and second crests 44 and 45 and the third and fourth crests 46 and 47. Consideration of FIGURE 6 indicates that the spacing between the second and third crests is actually a crimped fabric area 48 lying between two binder segments 41 and 41 which are in the same lengthwise row. As a consequence that particular spacing widens considerably as it is followed in a widthwise direction into that portion of the fabric occupied by a binder segment in the next lengthwise row containing binder segments 42 and 42. On the other hand, the spacing between the crests 44 and 45 and the crests 46 and 47 maintains a substantially equal width in this particular sample all the way across the width of the fabric.

Consideration of FIGURE 9 which is a cross-section of a modification of the nonwoven textile fabric disclosed in FIGURES 6 through 8 reveals a nonwoven textile fabric 50 having binder segments 51, 51 separated by unbonded fabric areas 53. Each unbonded fabric area 53 is shown as containing four crests 54, 55, 56 and 57. Consideration of the spacing between these crests reveals that spacing between the first and second crests 54 and 55 and that between the third and fourth crests 56 and 57 are decreased from the size of FIGURE 7 whereas the spacing between the second and third crests 55 and 56 is increased over the size of FIGURE 7. Such a modified nonwoven textile fabric 50 appears to the naked eye to comprise double rows formed by the crests 54 and 55 and by crests 56 and 57 separated by broader areas constituted by the binder segments 51. Inasmuch as the crests 54, 55, 56 and 57 follow a sinuous path across the fabric in very much the same fashion as the loops in a course of a knitted fabric, nonwoven textile fabric 50 strongly resembles a knitted fabric. Such an effect may be accomplished by spacing the binder segments closer together whereby the unbonded portions between the binder segments in any one crosswise row are less. Such will prevent the necking down of the unbonded portions between each binder segment in that particular crosswise row whereby the spacing between the second and third crests is increased.

With reference to FIGURE 10, a nonwoven textile fabric 60 is disclosed having binder segments 61, 61 and unbonded fabric portions 63. Each unbonded fabric area 63 is shown as containing four crests 64, 65, 66 and 67. It is to be immediately noted that the height to which these crests rise is not uniform and that a particularly irregular appearance is created. Such a modification is created by adjustment of the apparatus to be described hereinafter.

With reference to FIGURE 11, a nonwoven textile fabric 70 is disclosed comprising binder segments 71, 71 and unbonded fabric areas 73. Each unbonded fabric area 73 comprises only two crests 74 and 75. Such a modification is obtained, for example, by spacing the binder segments 71 in the same lengthwise row closer together whereby sufficient nonwoven fabric is available only for the formation of two crests. A similar effect is obtained by changing the speeds of the processing rolls of the apparatus to be described hereinafter.

One form of apparatus suitable for carrying out the preferred methods of the present invention is diagrammatically set forth in FIGURE 12. Such apparatus is basically similar in construction and in operating principle to the apparatus disclosed in U.S. Patent 2,765,514, issued October 9, 1956, to R. R. Walton. Consequently, merely the essence and basic fundamentals of such apparatus will be set forth herein. Reference should be made to the patent itself for greater particularity and specificity as to details of construction and operation.

As shown in FIGURE 12, the essential elements of the apparatus comprise a driving roll 90, a retarding or retardation roll 91, and a fabric feed plate 92 having a tapered nose piece 93. The intermittently bonded nonwoven fabric F to be processed is fed along the feed plate 92 past the nose piece 93 into the nip of the opposed, spaced driving and retardation rolls 90 and 91 and processed thereby into a crimped and crinkled bonded nonwoven textile fabric F¹.

The driving and retardation rolls 90 and 91 are adjustably positioned with respect to each other whereby the nip between these rolls may be controlled and adjusted according to the weight, thickness and type of fabric being processed. Similarly, the positioning of the fabric feed plate 92 may be adjustably controlled whereby its inclination and the positioning of its nose piece 93 can be regulated very precisely with respect to the nip of the rolls 90 and 91. It is not essential that the feed plate 92 be positioned on the fabric-feed side of the treating rolls 90 and 91. As a matter of fact, the positioning of the feed plate 92 on the fabric-discharge side of the treating rolls 90 and 91 has been found to be advantageous, particularly for lighter weight fabric. Regardless of its position, however, the feed plate 92 must perform its basic function of properly positioning the fabric F between the pinch or nip of the treating rollers 90 and 91 to be processed thereby into a crimped and crinkled fabric F¹.

The driving roll 90 travels at a peripheral linear speed greater than the peripheral linear speed of the retardation roll 91. Under normal operating conditions, the driving roll 90 will have a peripheral linear speed of from about 1.2 to about 3 times, and preferably from about 1.4 to about 2 times, the peripheral linear speed of the retardation roll 91.

The surface characteristics of the driving roll 90 are different than those of the retardation roll 91, the most important difference being a lower coefficient of friction. In this way, even though the driving roll 90 rotates with a greater peripheral linear speed, its friction or traction against the fabric is less than that of the retardation roll 91. Slippage of the driving roll 90 apparently occurs due to the greater magnitude of the opposed friction or drag of the retardation roll 91 and the nonwoven fabric bunches up into crimps and crinkles during its processing. This action is to be contrasted to the action which occurs when a woven fabric, for example, is processed by similar apparatus. In the case of the woven fabric wherein the warp and weft yarns are sinuous, the result is a compacting and an increase in the sinuosity particularly of the warp yarns. Such a result is illustrated in FIGURES 7 through 10 of U.S. Patent 2,765,514. However, when the same method is applied to a nonwoven fabric, the result is entirely different. In a nonwoven fabric, there are no yarns, there are merely fibers. Additionally, these fibers do not extend in both the so-called warp and weft directions; they merely extend generally in the long direction. And finally, they are not sinuous but are generally oriented in one direction only. As a consequence the fibers react differently and it has been established that the net result is not a compacting or preshrinking but actually a crimping or crinkling.

Different coefficients of friction are normally obtained for the driving roll and the retardation roll either by using different materials for each roll or by using like materials having different surface characteristics for each roll. For example, both rolls may be steel wherein the surface characteristics of at least one roll have been so changed as to provide the necessary difference in surface coefficients of friction. Both rolls may be natural or synthetic rubber but of different basic compositions whereby different surface properties are obtained. Combinations of steel and rubber may be used as well as other materials such as compressed paper, leather, wood, other metals, etc.

Knurling, etching or engraving of the surfaces of the rolls is beneficial and changes the surface properties and characteristics. This is true particularly for the driving roll 90, in order to provide a better frictional control or "bite" over the fabric F being fed. Enhanced surface effects are also noted in fabrics processed with such specially prepared rolls. Either or both of the processing rolls 90, 91 may be so modified. The knurling or other surface modifications may take any desired form and, in general, will depend upon the type, weight and thickness of the fabric being processed. For a light weight fabric, the knurling will be shallow; for a heavy weight fabric, the knurling will be deeper. The knurling may extend along the surface of roll parallel to the axis or it may extend angularly with a slight helical effect.

The knurling may extend angularly in both directions whereby lozenges or diamond shaped knurls are formed.

The use of a steaming device or other moistening apparatus 95 to wet out the nonwoven fabric F is not essential for all types, weights and thicknesses of fabrics. In many instances a nonwoven fabric, particularly the light weight varieties, has been satisfactorily processed in its natural condition merely containing its normal regain moisture. In some cases, the addition of a small amount of moisture, say, up to 25% by weight based on the weight of the dry nonwoven fabric, has been found beneficial.

Heating of the driving roll 90 and/or the retardation roll 91 has been found to be particularly advantageous. The temperatures to which these rolls may be heated will depend primarily upon the nature, properties and characteristics of the fibers in the fabrics being treated and the bonding materials used to stabilize and strengthen the fabric structure. Under normal conditions, such as when a viscose rayon web which has been bonded with viscose or regenerated cellulose is processed, elevated temperatures of from about 120° F. to about 300° F. have been found beneficial. With other or more heat resistant fibers, such as polyamide nylon 66 (hexamethylene-diamine-adipic acid), operating temperatures may be safely increased to 400° F. With other or less heat resistant fibers, such as "Vinyon" fibers (vinyl chloride-vinyl acetate), the safe operating temperatures must be lowered to below about 200° F.

FIGURE 13 is a photomacrograph (approximately 10×) of a typical nonwoven textile fabric prepared by the processes of the present invention from a "Keybak" nonwoven fabric similar to that illustrated in FIGURE 4. The resulting fabric is, of course, to be compared to FIGURE 6 illustrating a similar nonwoven textile fabric prepared from a "Masslinn" nonwoven fabric such as illustrated in FIGURE 1. In FIGURE 13, the troughs created by the binder segments are clearly distinguishable as a series of darker interconnected circular depressions extending widthwise of the nonwoven textile fabric (horizontal in FIGURE 13). The twin crests separating the rows of troughs are also clearly distinguishable as a sinuous plateau also extending widthwise of the nonwoven textile fabric.

The binder segments which tend to be harder and firmer than the unbonded fabric areas are thus buried in the troughs or depressions located intermediate the crests or plateaus which extend outwardly on both sides of the fabric. See FIGURES 7 and 8, for example. The crests and plateaus which extend outwardly are unbonded and are much softer and more yielding than the buried binder segments. As a result, a surprisingly soft and yielding fabric having an excellent hand is obtained. This is an outsanding feature of the fabric of the present invention.

Additionally, the net result of the rows of interconnected circular depressions or troughs and the sinuous plateau formed by the twin crests is a surprising knitted appearance apparently constituted of courses and wales of knitted yarns. The fabric openings and the fiber bundles in the nonwoven textile fabric enhance the knitted effect.

Figure 14:
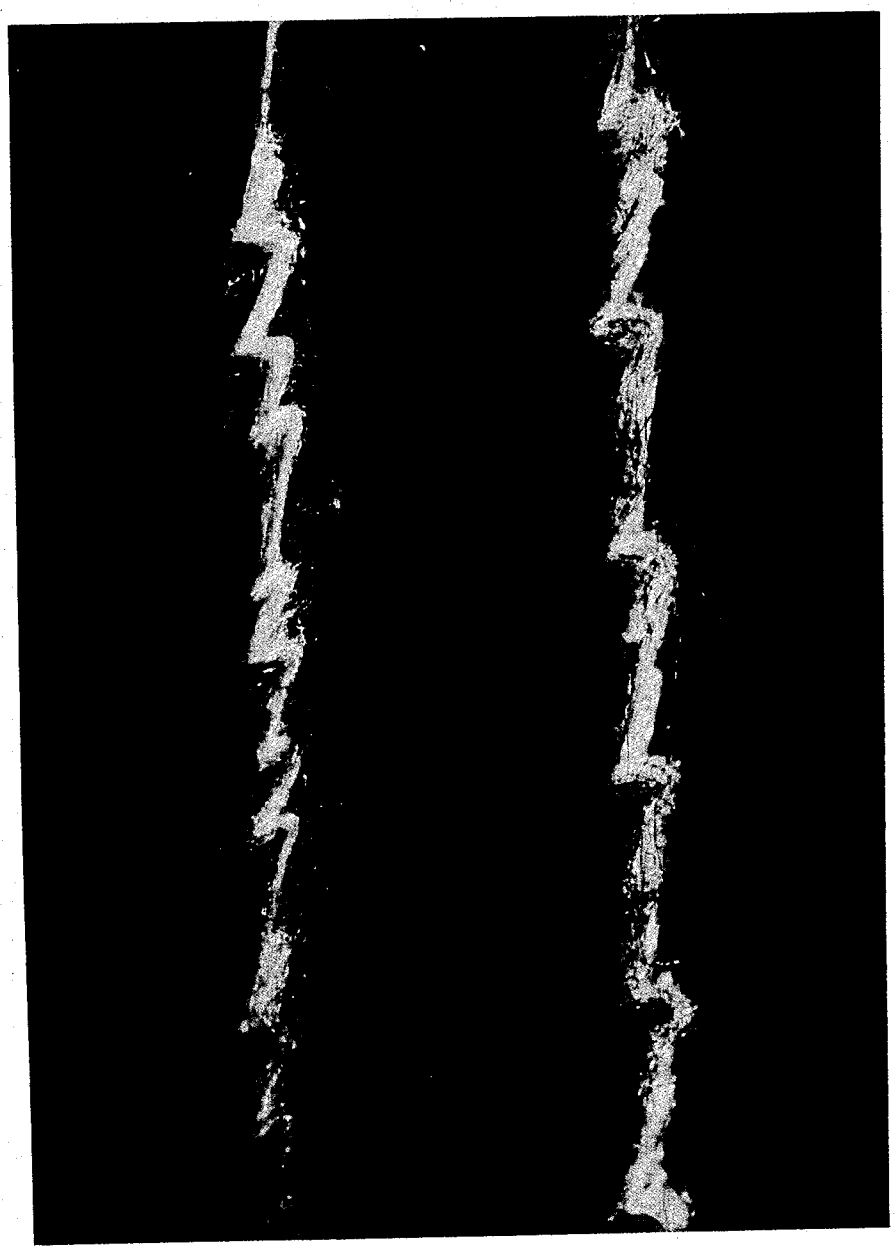
FIGURE 14 is a photomacrograph on an enlarged scale approximately 10:1 of a cross-sectional view of a portion of two other nonwoven textile fabrics of the present invention.

FIGURE 14 is a photomacrograph (approximately 10×) of a cross-section of two nonwoven textile fabrics of the present invention. This photomacrograph is to be compared to FIGURES 7 and 8, for example, which also represent cross-sections of other nonwoven textile fabrics of the present invention. The acuteness of the angles of the crimps and crinkles is particularly to be observed in this photomacrograph. The undercut nature of the angular configuration of the fabric is also notable. The binder segments are clearly distinguishable as a series of regularly spaced denser sections having a more solid and less fibrous appearance. Their positions in an intermediate portion of the fabric with the soft, unbonded crests and plateaus extending outwardly therefrom to create softness and hand in the fabric is also to be noted.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

The starting material is a "Keybak" nonwoven fabric which is prepared in accordance with methods set forth in the above-mentioned Kalwaites patent. The weight of the nonwoven fabric is about 650 grains per square yard. The fibers are 100% bright viscose rayon, the staple length being 2 inches and the denier being 1½. The nonwoven fabric is bonded with regenerated viscose in the form of a pattern of solid circular binder segments which are approximately 0.090 inch in diameter with each lengthwise row spaced from the adjacent lengthwise staggered row by approximately 0.095 inch (center to center distance) and with each circular binder segment in each lengthwise row separated by approximately 0.375 inch (center to center distance). The surface coverage by the binder segments is about 18%. The pattern described is somewhat generally similar to FIGURE 1 in United States Patent 2,705,686 issued April 5, 1955, to I. S. Ness et al.

The nonwoven fabric is delivered from a supply roll to a fabric processing device such as described in detail in United States Patent 2,765,513, issued October 9, 1956, to R. R. Walton the operating principles of which are illustrated in FIGURE 12 of this patent application. Both processing rolls are steel, with the driving roll having a lower coefficient of friction. Both are cross-knurled to different extents to form a diamond or lozenge print. The feed plate is positioned on the fabric discharge side of the processing and operates to push the nonwoven fabric into the pinch or nip of the processing rolls. The fabric discharge is about 28 yards per minute; the fabric feed is about 40 yards per minute. The temperature of the processing rolls is about 180° F. The nonwoven fabric possesses merely the moisture which is present due to its natural regain and is on the order of about 9% by weight, based on the weight of the dry fiber.

The nonwoven textile fabric processed by the treating rolls is highly crimped and crinkled in the form of lines or crests and troughs running in the cross direction. Microscopic analysis of a cross-section reveals that the major crests are approximately 0.150 inch apart; that the binder segments are still approximately 0.090 inch in diameter; and that the spaces between the circular binder segments in one row in the machine direction which was originally 0.375 inch is now approximately 0.300 inch. The spacing between the circular binder segments in the cross direction is unchanged. Each clear space between the binder segments is highly crimped and crinkled and normally contains four crimps. Reference is made to FIGURES 6 through 8 which illustrates such a fabric. The resulting fabric has an extremely soft hand, a high and pleasing luster, excellent drape, a high bulk and a resilience of approximately 25% in the long or machine direction and approximately 50% in the cross or transverse direction. It has high absorbency; its resistance to crushing is good and it has an excellent cushioning effect or "bounce" when used in one or a plurality of plies.

The nonwoven textile fabric can be made in a variety of weights of from as light as about 100 grains per square yard to as heavy as about 2000 grains per square yard. As such, it finds excellent uses as a cover for a sanitary napkin, as bandages, hospital sponges, backings for plastic coated materials, diapers and diaper liners, curtains, drapes, scarves, runners and place mats, etc. The nonwoven textile fabric has the unique property of conformability and pliability and is capable of adapting itself to any reasonable shape.

*Example II*

The procedures set forth in Example I are carried out substantially as set forth therein except that the nonwoven fabric is passed through a steaming device for a sufficient period of time as to raise the moisture content therein to approximately 25% by weight, based on the weight of the dry fabric. The results are comparable to those obtained in Example I.

*Example III*

The procedures set forth in Example I are followed substantially as set forth therein except that a blend of 50% by weight of staple cotton fibers and 50% by weight of viscose rayon 2 inches staple length, 1½ denier is used. The results are comparable to those obtained in Example I. The luster of the resulting fabric, however, is not as bright as the fabric of Example I.

*Example IV*

The nonwoven textile fabric resulting from Example I is padded with 3% solutions of melamine formaldehyde, sufficient to impart thereto approximately 4% by weight of solids, based on the weight of the dry nonwoven textile fabric. The treated fabric is then cured by methods known in the art. The crease resistance of the fabric is enhanced and the ability to hold a crease when it is wet is improved over the nonwoven textile fabric of Example I.

*Example V*

The procedures set forth in Example I are followed substantially as set forth therein with the exception that a fiber blend is used comprising 50% by weight of bright Viscose Rayon, 2 inches staple length, 1½ denier, and 50% by weight of Vinyon fibers (a co-polymerization product of vinyl chloride and vinyl acetate) having a denier of three and a staple length of 1¼ inches, made by American Viscose Corporation.

The inclusion of this percentage by weight of thermoplastic fibers permits the fabric to be heat-set and provides for much greater retentivity of the creases, crimps and crinkles over the nonwoven textile fabric of Example I. Heat setting of the resulting fabric is accomplished at a temperature of about 140° F.

*Example VI*

The procedures set forth in Example I are followed substantially as set forth therein with the exception that a fiber blend is used of about ⅓ by weight nylon 6 fibers, 3 inches staple length, 1½ denier; ⅓ by weight "Dacron" polyester fibers, 3 inches, staple length, 1½ denier; and ⅓ by weight bright viscose rayon, 2 inches staple length, 1½ denier. Heat setting is accomplished at about 285° F. The crimp retentivity is excellent.

*Example VII*

The procedures of Example I are followed substantially as set forth therein except that the starting material is a "Masslinn" nonwoven fabric, such as illustrated in FIGURES 1–3. The resulting nonwoven textile fabric possesses all the desirable properties and characteristics of the product of Example I, although to a lesser degree, due most likely to the absence of the fabric openings and fiber bundles which tend to enhance the fabric-like qualities and appearance.

*Example VIII*

The procedures of Example I are followed substantially as set forth therein except that the starting material comprises a wet formed, random laid, nonwoven fabric prepared by modified papermaking techniques known to the art. The fibers are a blend of 55% by weight of ½ inch staple nylon 6, 3 denier, and 45% by weight ⅜ inch staple viscose rayon, 1½ denier. The weight of the random-laid fabric is about 1000 grains per square yard. It is bonded with viscose or regenerated cellulose in the form of lines 0.015 inch wide, 16 lines per inch in the machine direction. The lines extend across the fabric at an angle of about 15° to the cross-axis. The binder coverage is about 24% of the surface of the fabric. The crimps and crinkles between the binder lines give the nonwoven textile fabric a twill or ribbed effect.

*Example IX*

The procedures set forth in Example I are followed substantially as set forth therein with the exception that a closely packed octagonal and square pattern is used to provide a high surface coverage of the binder segments of approximately 65%. The desirable hand and drape is not obtained in the resulting nonwoven fabric and it is lacking in softness, conformability and pliability.

*Example X*

The procedures set forth in Example I are followed substantially as set forth therein with the exception that the nonwoven fabric is uniformly impregnated with an all-over bond covering the nonwoven fabric surface completely. The desirable hand and drape is not obtained in the resulting nonwoven fabrics and it is harsh and stiff.

Although several specific examples of the inventive concept have been described, the same should not be construed as limited thereby nor to the specific substances or constructions mentioned therein but to include various other equivalent substances and constructions as set forth in the claims appended hereto. It is understood that any suitable changes, modifications and variations may be made without departing from the spirit and scope of the invention.

What is claimed is:

1. A method of forming a bonded fibrous nonwoven textile fabric having a soft hand and drape and excellent elasticity and conformability which comprises: bonding a web of textile fibers in a predetermined pattern of spaced rows of discrete binder segments weighing from about 1% to about 35% of the weight of the nonwoven textile fabric and covering less than about 35% of the lateral surface of the nonwoven textile fabric, said rows of discrete binder segments lying at an angle to the long axis of said web in bonding relationship with the textile fibers passing therethrough to form a nonwoven fabric and being separated by rows of unbonded fabric areas; and then crimping the rows of unbonded areas between said rows of discrete binder segments into successive crests and troughs while leaving the rows of discrete binder segments smooth and relatively uncrimped and lying largely upon the sloping surfaces between each crest and an immediately adjacent trough.

2. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

3. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the lateral surface of the fabric and being relatively smooth and uncrimped, and the areas containing no binder segments being relatively highly crimped to provide alternate crests and troughs extending to both surfaces of said fabric, the top of each crest and the bottom of each trough extending at an angle to the long axis of said fabric, whereby said binder segments lie largely upon the sloping surfaces between each crest and an immediately adjacent trough and are thus buried largely between said crests and troughs and do not affect the soft hand of the fabric.

4. A bonded fibrous nonwoven textile fabric having a soft hand and drape and elasticity and conformability, comprising a web of overlapping textile fibers bonded in a predetermined pattern of discrete, spaced binder segments lying in spaced rows extending approximately at right angles to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending to both surfaces of said fabric, the top of each crest and the bottom of each trough extending generally at right angles to the long axis of said fabric, whereby said binder segments lie largely intermediate the surfaces of the fabric and are buried largely between said crests and troughs and do not affect the soft hand of the fabric.

5. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending across the width of said fabric and to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

6. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, said rows of binder segments defining between them sinuous areas of fabric, there being no binder segments in said sinuous areas, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

7. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, said spaced binder segments having the form of rounded geometric figures, said rows of binder segments defining between them sinuous areas of fabric, there being no binder segments in said sinuous areas, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

8. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, each of the said areas containing no binder segments having the same number of crests therein, whereby said binder segments lie largely intermediate the surfaces of the fabric and are buried largely between said crests and troughs and do not affect the soft hand of the fabric.

9. A bonded fibrous nonwoven textile fabric having a soft hand and drape and elasticity and conformability, comprising a web of overlapping textile fibers which are arranged in a predetermined pattern of openings and fiber bundles, said web being bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering less than about 35% of the laterial surface of the fabric and being relatively smooth and uncrimped, and the area containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

10. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 35% of the weight of the fabric and covering from about 10% up to about 25% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

11. A bonded fibrous nonwoven textile fabric having a soft hand and drape and elasticity and conformability, comprising a web of overlapping textile fibers bonded in a predetermined pattern of discrete, spaced binder segments lying in spaced rows extending at an angle to the long axis of said web in bonding relationship with the fibers passing therethrough to form a nonwoven fabric, there being no binder segments in the areas of the fabric between said rows of binder segments, said binder segments weighing from about 1% to about 25% of the weight of the fabric and covering from about 10% up to about 25% of the lateral surface of the fabric and being relatively smooth and uncrimped, and the areas containing no binder segments being relatively highly crimped to provide crests and troughs extending to both surfaces of said fabric, the top of each crest and the bottom of each trough extending at an angle to the long axis of said fabric, whereby said binder segments lie largely intermediate the surfaces of the fabric and are buried largely between said crests and troughs and do not affect the soft hand of the fabric.

12. A method of forming a bonded fibrous nonwoven textile fabric having a soft hand and drape and excellent elasticity and conformability which comprises: bonding a web of textile fibers in a predetermined pattern of spaced rows of discrete binder segments weighing from about 1% to about 35% of the weight of the nonwoven textile fabric and covering less than about 35% of the lateral surface of the nonwoven textile fabric, said rows of discrete binder segments being in bonding relationship with the textile fibers passing therethrough and being separated by rows of unbonded fabric areas; and then passing said web between a moving driving surface and a retarding surface to crimp the rows of unbonded areas between said rows of discrete binder segments while leaving the discrete binder segments smooth and relatively uncrimped.

13. A method of forming a bonded fibrous nonwoven textile fabric having a soft hand and drape and excellent elasticity and conformability which comprises: bonding a web of textile fibers in a predetermined pattern of spaced rows of discrete binder segments weighing from about 1% to about 35% of the weight of the nonwoven textile fabric and covering less than about 35% of the lateral surface of the nonwoven textile fabric, said rows of discrete binder segments being in bonding relationship with the textile fibers passing therethrough and being separated by rows of unbonded fabric areas; and then passing said web between a moving driving surface and a moving retarding surface closely spaced thereto, with the area of closest proximity of said two surfaces being substantially parallel to said rows of discrete binder segments, to crimp the rows of unbonded areas between said rows of discrete binder segments while leaving the discrete binder segments smooth and relatively uncrimped.

References Cited in the file of this patent

UNITED STATES PATENTS

| | | |
|---|---|---|
| 2,018,244 | Alm | Oct. 22, 1935 |
| 2,245,289 | Muller | June 10, 1941 |
| 2,573,773 | Rowe | Nov. 6, 1951 |
| 2,705,686 | Ness et al. | Apr. 5, 1955 |
| 2,705,692 | Petterson | Apr. 5, 1955 |
| 2,808,635 | Parker et al. | Oct. 8, 1957 |
| 2,880,113 | Drelich | Mar. 31, 1959 |